H. S. PETERSEN.
MEASURING DEVICE.
APPLICATION FILED AUG. 8, 1918. RENEWED JUNE 15, 1921.
1,385,270.  Patented July 19, 1921.
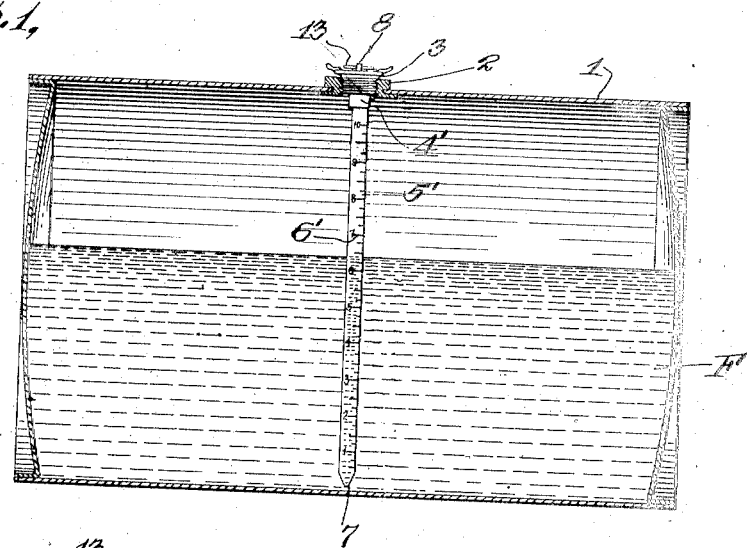
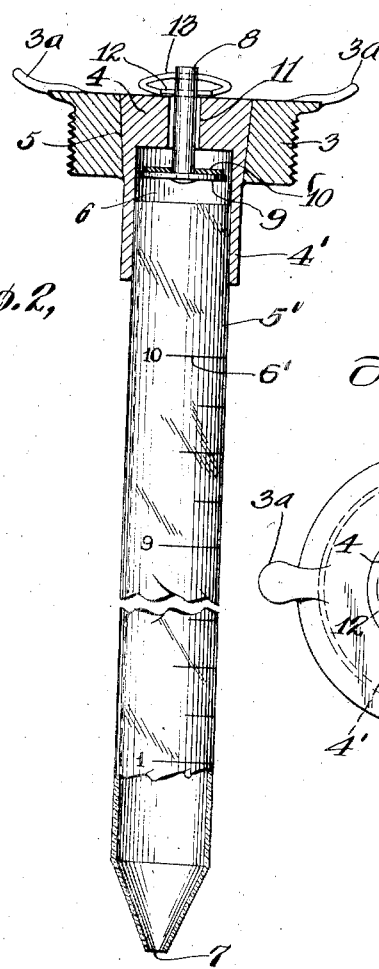
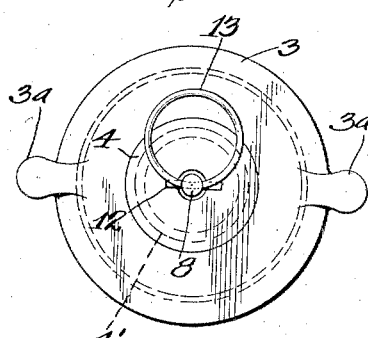
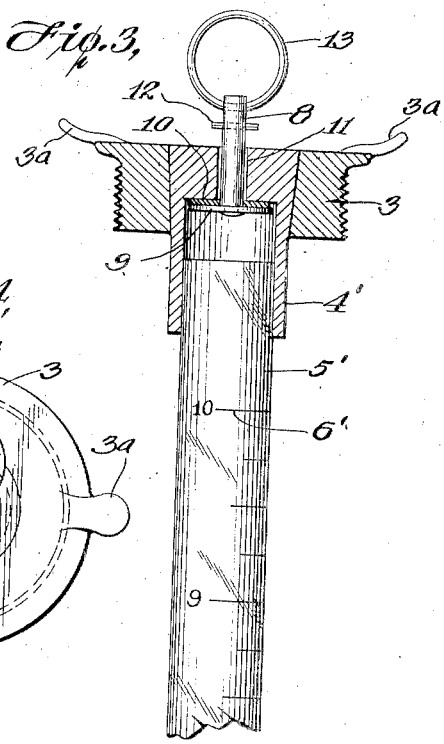
Inventor
H. S. Petersen
By J. K. Bryant.

UNITED STATES PATENT OFFICE.

HOLGER S. PETERSEN, OF BROOKLYN, NEW YORK.

MEASURING DEVICE.

1,385,270.  Specification of Letters Patent.  Patented July 19, 1921.

Application filed August 8, 1918, Serial No. 248,925. Renewed June 15, 1921. Serial No. 477,866.

*To all whom it may concern:*

Be it known that I, HOLGER S. PETERSEN, a citizen of the United States, residing at Brooklyn, in the county of Kings and State of New York, have invented certain new and useful Improvements in Measuring Devices, of which the following is a specification.

This invention relates to new and useful improvements in measuring devices and more especially to that class of such devices designed for measuring the volume or quantity of different kinds of liquids and fluids.

The primary object of the invention is the provision of a fluid gage or measure whereby the quantity of fluid within a container, such as a tank, can be accurately ascertained instantly whenever desired, the arrangement being such that the operation of measuring the fluid opens the container for the entrance and admission of more fluid if found desirable.

More specifically, my measuring device may be employed as a gage or measure for gasolene tanks such as those carried by automobiles and whereby the quantity of gasolene may be quickly ascertained at any time and more gasolene poured into the tank whenever the occasion requires.

With these general objects in view and others that will appear as the nature of the invention is better understood, the same consists in the novel combination and arrangement of parts hereinafter fully described, illustrated in the accompanying drawings and then claimed.

In the drawing forming a part of this application and in which like reference characters designate corresponding parts throughout the several views, Figure 1 is a vertical longitudinal sectional view through a gasolene tank provided with my invention, Fig. 2 is a central sectional view through the device detached and with parts broken away, Fig. 3 is a view similar to Fig. 2 with the valve closed for withdrawing the gage from the tank, and Fig. 4 is a top plan view of the invention removed from the tank.

Referring more in detail to the drawing, a metal gasolene tank 1 is shown by way of illustration of a form ordinarily employed upon automobiles, although it will be understood that my gage is serviceable for measuring the fluid contained within any form of holder.

The tank 1 is provided with a bushing 2 adapted for receiving a threaded plug or closure 3 having oppositely projecting ears $3^a$ for convenience in turning the plug 3 when screwing the same into and out of the said bushing. A block or stopper 4 of slightly tapered cylindrical form is removably positioned centrally through the plug 3, a filling opening 5 being provided through the plug for the reception of the said stopper 4.

A tubular extension 4' depends from the stopper 4 beneath the plug 3 having the upper end of a transparent tube 5' secured within the bore 6 of the extension. The said tube 5' is preferably formed of glass and is similar in shape to the tube of a fountain pen filler having an opening 7 in its tapered free end and which end is immersed in the gasolene F within the tank 1 when the stopper 4 and plug 3 are in their normal closed positions.

A stem 8 extends through an axial passage 11 through the stopper 4 and is provided with a head 9 in the form of a disk positioned within the bore 6 while a washer or packing 10 upon the head 9 is adapted for closing the opening 11 when the stem 8 is drawn outwardly by means of the ring 13 swingingly carried by the outer end of the stem. A cross pin 12 is provided upon the stem 8 for limiting the inward movement of the stem and its head 9. The closed position of the packing 10, which together with the head 9 forms a valve for the passage 11, is shown in Fig. 3 of the drawing while the normal position of the valve with the passage 11 open is shown in Fig. 2 thereof.

Graduations 6' are provided upon the tube 5' and it will be understood that such graduations are placed upon the tube 5' by accurate calculations for registering whatever quantity of gasolene F is contained within the tank 1, such graduations preferably designating gallons and fractions thereof.

The operation of the device will be apparent from this detailed description thereof, it being seen that the tube 5' is normally positioned upright diametrically of the tank 1 and with the gasolene F filling the tube of the same height as the gasolene level of the tank. It will be obvious that a reading of the graduations 6' will disclose the number of gallons of gasolene within the tank 1 and by pulling upwardly on the ring 13, the valve 9—10 will close the passage 11 while the stopper 4 will be withdrawn from the plug 3, bringing the tube 5' outwardly of the tank 1 and where the graduations 6' may be read. The retention of the gasolene within the tube 5' during its retraction from the tank 1 will be understood in that the closing of the passage 11 prevents the pressure of the atmosphere from engaging the upper surface of the gasolene within the tube 5' so that the gasolene is retained therein. The stopper 4 being removed, the tank 1 may be replenished through the opening 5 without removing the plug 3 from the bushing 2. The plug 4 is then reinserted into the plug 3 and the weight of the stem 8 with the members carried thereby causes the valve 9—10 to lower for unseating the passage 11.

The invention may also be of service in withdrawing small quantities of gasolene from the tank 1, which is often desirable, but which is usually a difficult matter in automobile tanks or containers which only have an opening in the top thereof. In such cases, the stopper 4 and tube 5' may be withdrawn and upon releasing the ring 13, the quantity of gasolene within the tube 5' may be deposited outside of the tank 1. In this manner, small quantities of gasolene may be withdrawn at any time from the tank. While the form of the invention herein shown and described is what is believed to be the preferable embodiment thereof, it is nevertheless to be understood that minor changes may be made therein if desired in the details of construction, size, and proportion of parts without departing from the spirit and scope of the invention as claimed.

What I claim as new is:—

1. A measuring device comprising a plug having an opening therethrough, a tubular extension depending from said plug, a transparent tube secured within said extension having an open tapered free end, a stem slidably positioned through said opening, a valve upon the inner end of said stem adapted for closing said opening when the stem is retracted, a movement limiting pin upon the stem outwardly of the block and a handle at the outer end of the stem.

2. A liquid measuring device comprising a plug having an opening therethrough, a transparent tube secured to the plug in axial alinement with said opening and having an open tapered free end adapted for extending into the liquid to be measured, a stem slidably positioned through said opening extending outwardly of the plug, and a valve upon the inner end of said stem adapted for closing said opening when the stem is retracted.

In testimony whereof I affix my signature.

HOLGER S. PETERSEN.